(12) United States Patent
Nguyen

(10) Patent No.: US 8,335,183 B2
(45) Date of Patent: Dec. 18, 2012

(54) PROVISION OF DOWNLINK PACKET ACCESS SERVICES TO USER EQUIPMENT IN SPREAD SPECTRUM COMMUNICATION NETWORK

(75) Inventor: Phong Nguyen, Victoria (AU)

(73) Assignee: Nec Corporation, Tokyo (JP)

( * ) Notice: Subject to any disclaimer, the term of this patent is extended or adjusted under 35 U.S.C. 154(b) by 888 days.

(21) Appl. No.: 12/064,796

(22) PCT Filed: Aug. 24, 2006

(86) PCT No.: PCT/JP2006/317148
§ 371 (c)(1),
(2), (4) Date: Feb. 25, 2008

(87) PCT Pub. No.: WO2007/024012
PCT Pub. Date: Mar. 1, 2007

(65) Prior Publication Data
US 2009/0137258 A1    May 28, 2009

(30) Foreign Application Priority Data
Aug. 26, 2005   (AU) ................. 2005904679

(51) Int. Cl.
*H04W 4/00* (2009.01)
*H04J 1/00* (2006.01)
*H04H 20/71* (2008.01)
*H04M 1/66* (2006.01)

(52) U.S. Cl. ....... 370/329; 370/480; 370/312; 455/3.01; 455/410

(58) Field of Classification Search .................. 370/311, 370/328–333, 341, 345–350, 377, 384, 433, 370/437, 445; 455/432.3, 434–435.3, 450–452.2, 455/456.1–456.6
See application file for complete search history.

(56) References Cited

U.S. PATENT DOCUMENTS

| | | | |
|---|---|---|---|
| 7,493,117 B2 * | 2/2009 | Cai et al. .................. | 455/434 |
| 2003/0073409 A1 * | 4/2003 | Nobukiyo et al. .......... | 455/67.1 |
| 2003/0078050 A1 | 4/2003 | Carlborg et al. | |
| 2003/0119452 A1 * | 6/2003 | Kim et al. ................. | 455/69 |
| 2004/0087320 A1 * | 5/2004 | Kim et al. ................. | 455/458 |
| 2004/0137946 A1 | 7/2004 | Kawabata | |
| 2004/0142706 A1 * | 7/2004 | Kim et al. ................. | 455/458 |
| 2004/0151133 A1 * | 8/2004 | Yi et al. .................... | 370/312 |
| 2004/0203336 A1 * | 10/2004 | Sinnarajah et al. ........ | 455/3.01 |
| 2004/0213214 A1 * | 10/2004 | Jung et al. ................. | 370/352 |
| 2005/0007971 A1 * | 1/2005 | Jeong et al. ............... | 370/312 |
| 2005/0037767 A1 * | 2/2005 | Kim et al. ................. | 455/450 |
| 2005/0147127 A1 * | 7/2005 | Putcha et al. ............. | 370/480 |
| 2005/0159135 A1 * | 7/2005 | Kim ........................... | 455/410 |
| 2006/0067353 A1 * | 3/2006 | Pekonen et al. ........... | 370/432 |
| 2006/0166653 A1 * | 7/2006 | Xu et al. .................... | 455/412.2 |

FOREIGN PATENT DOCUMENTS

| | | |
|---|---|---|
| EP | 1478203 A2 | 11/2004 |
| GB | 2378101 A | 1/2003 |
| JP | 10-290172 | 10/1998 |
| JP | 2001-197021 | 7/2001 |
| JP | 2001-509346 | 7/2001 |
| JP | 2004-23668 | 1/2004 |

* cited by examiner

*Primary Examiner* — Ian N Moore
*Assistant Examiner* — Brian T Le
(74) *Attorney, Agent, or Firm* — Dickstein Shapiro LLP

(57) ABSTRACT

A method of providing a packetized data transmission service to a mobile terminal in a spread spectrum communication network, includes: at a transmitter, broadcasting an indication message to a cell on a downlink broadcast channel, the indication message providing notification of an available packetized data transmission service intended for the mobile terminal; at the mobile terminal, monitoring the broadcast channel for the indication message, and upon receipt, acknowledging detection of the indication message to the transmitter on an uplink contention channel; and at the transmitter, upon contention completion, transmitting packetized data transmission service configuration information to the mobile terminal on the broadcast channel.

11 Claims, 2 Drawing Sheets

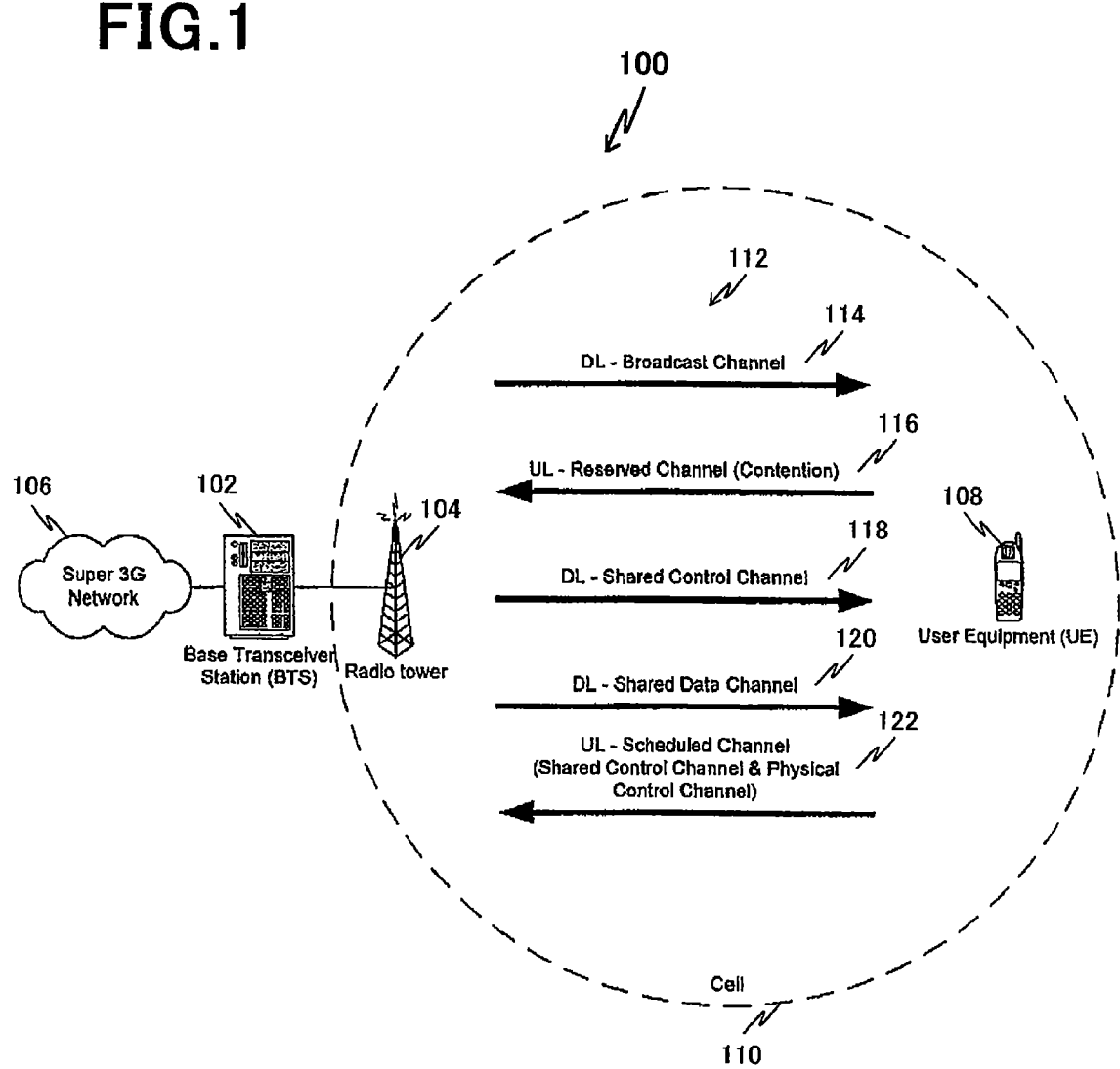

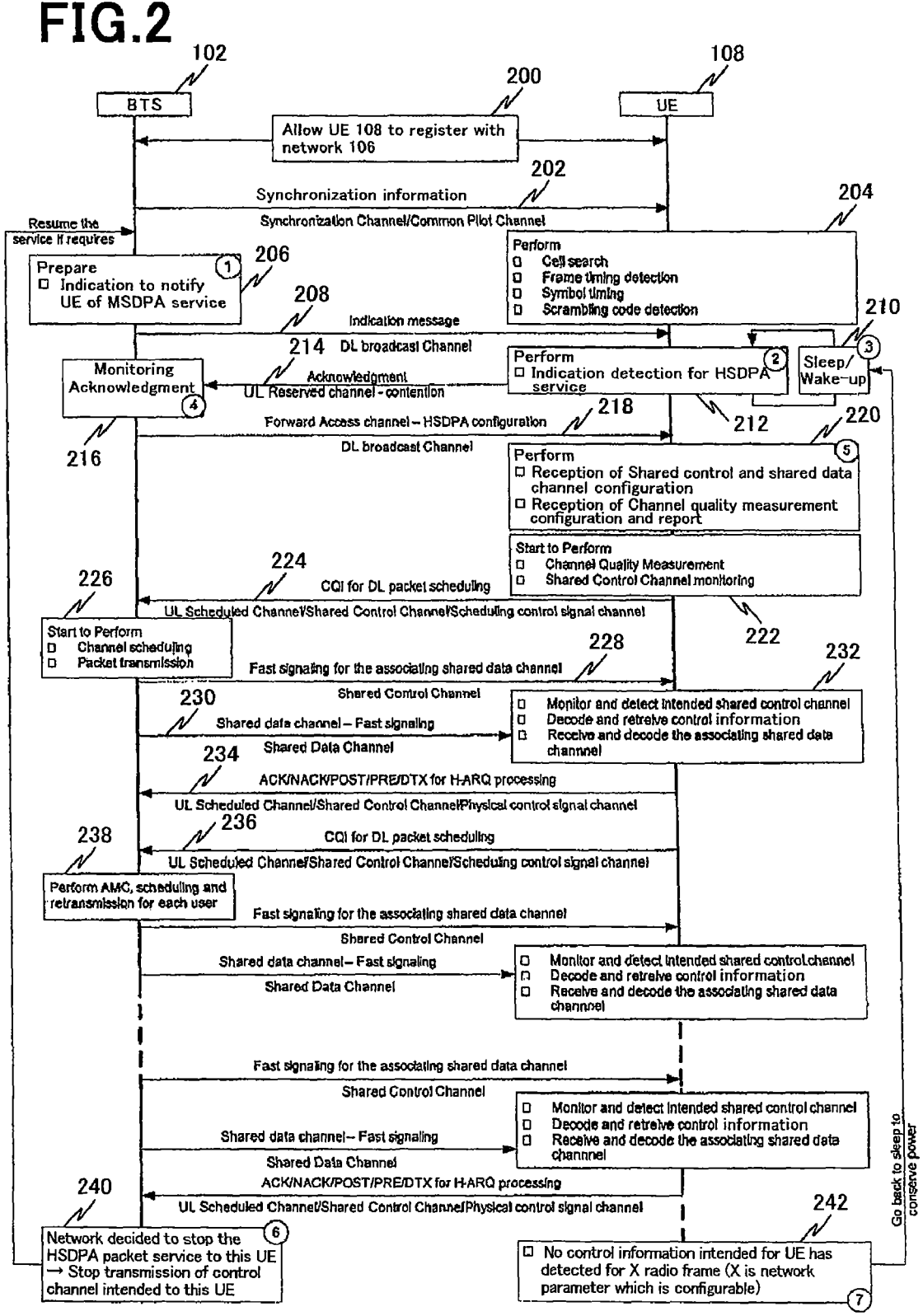

PROVISION OF DOWNLINK PACKET ACCESS SERVICES TO USER EQUIPMENT IN SPREAD SPECTRUM COMMUNICATION NETWORK

BACKGROUND OF THE INVENTION

1. Field of the Invention

The present invention relates generally to the provision of downlink packet access services to a mobile station in a spread spectrum communication network. The invention is suitable for use in the provision of such services to a user equipment in a communication network conforming to the 3GPP-LTE standards being developed by the 3rd Generation Partnership Project (3GPP), and it will be convenient to describe the invention in relation to this exemplary, but non-limiting, application.

2. Description of the Related Art

Recent enhancements in packet transmissions such as High Speed Downlink Packet Access (HSDPA) and enhanced uplink technology have made 3GPP radio-access technology highly competitive. In order to ensure that the competitiveness of this technology continues over a long time frame, a long term evolution of 3GPP radio-access technology is being developed. This new technology is known as Super 3G.

Important parts of the long term evolution of Super 3G technology will include Radio Access Network (RAN) latency reduction, higher user data rates, improving system capability and coverage, and reducing cost to a network operator. In order to achieve this, an evolution of the radio interface as well as the radio network architecture is being considered. The objective of this evolution is to develop a framework to enable high data rate, low-latency and packet-optimized radio-access.

Development of the Super 3G system has been focused on supporting services provided by the PS-domain, such as enhanced HSDPA, Multimedia Broadcast Multicast Services (MBMS), High Speed Uplink Packet Access (HSUPA) and other similar types of packet-switched services including Voice Over IP.

Existing HSDPA services in Wideband Code Division Multiple Access (WCDMA) systems are currently provided in a manner that is dependent on other dedicated RAN services. This results in an extremely complicated protocol stack design, and hinders the development of HSDPA services in WCDMA.

The Super 3G system will be developed to support enhanced HSDPA and other types of packet-switched services. However, reusing the existing HSDPA-related procedures that have been developed for the WCDMA system will lead to a situation where the future 3G system shall be coupled with and operationally dependent on existing WCDMA technology. This interdependence is likely to result in an even more complicated RAN architecture, which will then increase the cost of design, manufacture and operation of the Super 3G system.

There therefore exists a need to enable enhanced HSDPA services to be introduced into the future Super 3G system in such a manner as to be able to operate independently from the existing 3G-WCDMA system when considered from the RAN perspective. There also exists a need to provide enhanced HSDPA services in a manner that ameliorates or overcomes HSDPA service provision techniques.

SUMMARY OF THE INVENTION

In one aspect of the present invention, there is provided a method of providing a packetized data transmission service to a mobile terminal in a spread spectrum communication network, the method including at a base station, broadcasting an indication message to a cell on a downlink broadcast channel, the indication message providing notification of an available packetized data transmission service intended for the mobile terminal, at the mobile terminal, monitoring the broadcast channel for the indication message, and upon receipt, acknowledging detection of the indication message to the base station on an uplink contention channel, and at the base station, upon contention completion, transmitting packetized data transmission service configuration information to the mobile terminal on the broadcast channel.

The method may further include the steps of periodically placing the mobile terminal in an active state to monitor the broadcast channel for the indication message, and placing the mobile terminal in an inactive state, if no indication message is detected.

The method may further include the step of at the base station, transmitting control information for the packetized data transmission service to the mobile terminal on a downlink shared control channel.

The method may further include the step of at the base station, transmitting data for the packetized data transmission service to the mobile terminal on a downlink shared data channel.

The method may further include the step of at the mobile terminal, transmitting channel quality measurement and reporting information to the base station on an uplink shared scheduled channel.

The method may further include the steps of ceasing transmission from the base station of packetized data transmission control information to the mobile terminal, and upon failure to detect the packetized data transmission control information at the mobile terminal within a predetermined time, terminating the packetized data transmission service.

The method may further include the steps of at the base station, notifying the mobile terminal to terminate the packetized data transmission service by inclusion of a termination message in a packet header of an packetized data transmission control information packet, and upon detection of the termination message at the mobile terminal, terminating the packetized data transmission service.

For instance, the mobile terminal is comprised of a mobile phone.

In another aspect of the present invention, there is provided a method of controlling an operation of a base station for providing a packetized data transmission service to a mobile terminal in a spread spectrum communication network, the method including broadcasting an indication message to a cell on a downlink broadcast channel, the indication message providing notification of an available packetized data transmission service intended for the mobile terminal, the mobile terminal monitoring the broadcast channel for the indication message, and upon receipt, acknowledging detection of the indication message to the base station on an uplink contention channel, and upon contention completion, transmitting packetized data transmission service configuration information to the mobile terminal on the broadcast channel.

The method may further include the step of transmitting control information for the packetized data transmission service to the mobile terminal on a downlink shared control channel.

The method may further include the step of transmitting data for the packetized data transmission service to the mobile terminal on a downlink shared data channel.

The method may further include the steps of ceasing transmission of packetized data transmission control information to the mobile terminal, and upon failure to detect the packetized data transmission control information at the mobile terminal within a predetermined time, terminating the packetized data transmission service.

The method may further include the steps of notifying the mobile terminal to terminate the packetized data transmission service by inclusion of a termination message in a packet header of an packetized data transmission control information packet, and upon detection of the termination message at the mobile terminal, terminating the packetized data transmission service.

In still another aspect of the present invention, there is provided a program for causing a computer equipped in a base station to carry out the above-mentioned method.

In yet another aspect of the present invention, there is provided a system for providing a packetized data transmission service in a spread spectrum communication network, the system including a base station and a mobile terminal, the base station being adapted to broadcast an indication message to a cell on a downlink broadcast channel, the indication message providing notification of an available packetized data transmission service intended for the mobile terminal, the mobile terminal being adapted to monitor the broadcast channel for the indication message, and upon receipt, acknowledging detection of the indication message to the base station on an uplink contention channel, and the base station being further adapted, upon contention completion, to transmit packetized data transmission service configuration information to the mobile terminal on the broadcast channel.

In the above-mentioned system, the mobile terminal may be comprised of a mobile phone.

In still yet another aspect of the present invention, there is provided a base station in a system for providing a packetized data transmission service in a spread spectrum communication network, the system including the base station and a mobile terminal, the base station being adapted to broadcast an indication message to a cell on a downlink broadcast channel, the indication message providing notification of an available packetized data transmission service intended for the mobile terminal, the mobile terminal being adapted to monitor the broadcast channel for the indication message, and upon receipt, acknowledging detection of the indication message to the base station on an uplink contention channel, and the base station being further adapted, upon contention completion, to transmit packetized data transmission service configuration information to the mobile terminal on the broadcast channel.

The present invention will now be described in reference to the attached drawings in which a method and system of providing a High Speed Downlink Packet Access (HSDPA) service is illustrated as a preferred embodiment. It is to be appreciated that the invention is not to be construed as being limited to the particular embodiment illustrated in the drawings.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 1 is a schematic diagram illustrating a spread spectrum communication system in which an HSDPA service is provided from a base transceiver station to a user equipment.

FIG. 2 is a timing diagram illustrating the functional steps performed at both the base transceiver station and the user equipment during notification, acknowledgement, performance and termination of the HSDPA service.

DESCRIPTION OF THE EXEMPLARY EMBODIMENTS

Preferred embodiments in accordance with the present invention will be explained hereinbelow with reference to drawings.

Referring now to FIG. 1, there is shown generally a spread spectrum communication network 100 including a base transceiver station (BTS) 102 operably connected to a radio transmission tower 104, and a user equipment (UE) 108.

For instance, the user equipment 108 is comprised of a mobile phone.

The base transceiver station (BTS) 102 and the radio tower 104 are operably connected to a communication network (Super 3G network) 106 conforming to the Super 3G system being developed by the 3GPP.

The base transceiver station 102 communicates with the user equipment 108 whilst the user equipment 108 is located within a broadcast cell 110. Control information and data is exchanged between the base transceiver station 102 and the user equipment 108 during the provision of High Speed Downlink Packet Access (HSDPA) services by means of a channel structure 112 including a downlink (DL) broadcast channel 114, an uplink (UL) reserved channel (contention) 116, a downlink (DL) shared control channel 118, a downlink (DL) shared data channel 120, and an uplink scheduled channel (shared control channel and physical control channel) 122.

For instance, the base transceiver station 102 includes a central processing unit (CPU), a first memory, a second memory, an input interface through which a command and/or data is input into the central processing unit, an output interface through which a result of steps having been executed by the central processing unit is output, and a bus through which the central processing unit is electrically connected with the first memory, the second memory, the input interface, and the output interface.

Each of the first and second memories and is comprised of a semiconductor memory such as a read only memory (ROM), a random access memory (RAM) or an IC memory card, or a storage device such as a flexible disc, a hard disc or an optic magnetic disc.

For instance, the first memory comprises a read only memory (ROM), and the second memory comprises a random access memory (RAM).

The first memory stores therein a program for causing the central processing unit to carry out a method of controlling an operation of the base transceiver station 102 for providing a packetized data transmission service to the user equipment 108 in a spread spectrum communication network. The second memory stores therein various data and parameters, and presents a working area to the central processing unit. The central processing unit reads the program out of the first memory, and executes the program. Thus, the central processing unit operates in accordance with the program stored in the first memory.

Referring now to FIG. 2, when the user equipment 108 moves within the broadcast cell 110, both the base transceiver station 102 and the user equipment 108 act at step 200 to allow the user equipment 108 to register with the Super 3G network 106 and thereby enable the base transceiver station 102 to communicate directly with the user equipment 108.

At step 202, the base transceiver station 102 transmits synchronization information to the user equipment 108 on a synchronization channel/common pilot channel in order for the user equipment 108 to detect relevant information sent to the user equipment 108 in data packets.

Upon receipt of the synchronization information at step 202, the user equipment 108 performs, at step 204, cell search, frame timing detection, symbol timing, and scrambling code detection functions in accordance with conventional WCDMA techniques to enable communication to be established between the Super 3G network 106 and the user equipment 108.

When an HSDPA service is to be provided to the user equipment 108, an indication message is prepared at step 206 to be broadcast to the entire cell 110, the indication message being encoded in such way that it can be decoded and identified by the user equipment 108 by a specific user equipment identification number that is allocated to the user equipment 108 by the Super 3G network 106 at step 200. The indication message acts to notify the user equipment 108 of an available HSDPA services intended for the user equipment 108.

The encoded information is then broadcast at step 208 on the downlink broadcast channel 114 (set of sub-carriers), the user equipment 108 being informed of the downlink broadcast channel 114 upon registration with the Super 3G network 106 at step 200.

At step 210, the user equipment 108 is normally in an inactive (sleep) state, except for predetermined periods of time when, in step 212, the user equipment 108 is placed in an active (wake-up) state in order to monitor the downlink broadcast channel 114 for indication messages transmitted from the base transceiver station 102.

If no indication message is detected, the user equipment 108 is once again placed in an inactive state.

However, if an indication message is detected, the user equipment 108 processes the indication message, and transmits an acknowledgement 214 of detection of the indication message to the base transceiver station 102 on the uplink reserved channel 116 using a contention approach. The uplink reserved channel information on which the acknowledgement 214 is transmitted is indicated to the user equipment 108 in the indication message.

The base transceiver station 102 monitors the uplink reserved channel 116 at step 216 for the acknowledgement 214.

Upon receipt of the acknowledgement 214 from the user equipment 108, the base transceiver station 102 informs the user equipment 108 about the contention completion, and starts to prepare and transmit the RAN HSDPA service configuration information 218 on the downlink broadcast channel 114, at a time and frequency allocated for this task. This downlink broadcast channel 114 is monitored only by the user equipment(s) 108 that previously sent an acknowledgement 214 to the indication message.

Upon successful completion of the contention, the user equipment 108 prepares to receive data on the downlink broadcast channel 114 at a predetermined time after completion of the contention, at step 220. The configuration information received on this channel assists the user equipment 108 to perform layer 1 (physical layer), layer 2 (medium access control/radio link control), and layer 3 (Radio Resource Control layer) configuration to monitor the downlink shared control channel 118, configuring the Hybrid Automatic Repeat Request (HARQ) related functions and performing channel quality measurement and reporting.

Once the configuration has taken place at step 220, the user equipment 108 starts performing, at step 222, channel quality measurement, and monitoring of the downlink shared control channel 118 to detect fast signaling intended for the user equipment 108 and other existing HSDPA related procedures for receiving data on the downlink shared data channel 120.

Accordingly, channel quality information (CQI) 224 is transmitted from the user equipment 108 to the base transceiver station 102 according to a preconfigured schedule in order to provide the base transceiver station 102 with information as to which frequency chunk in the downlink shared data channel 120 is best suited for the particular user equipment 108 in order that frequency scheduling can be optimized.

The channel quality information 224 is transmitted on the uplink scheduled channel 122. Once the base transceiver station 102 has received initial channel quality information 224, the base transceiver station 102, at step 226, performs channel scheduling and sends fast signaling information 228 on the downlink shared control channel 118 to the user equipment 108.

The associated packet data 230 is then sent on the downlink shared data channel 120 to the user equipment 108. At step 232, the user equipment 108 keeps monitoring the downlink shared control channel 118 on the allocated time-frequency slot.

Once the user equipment 108 detects control information intended for that user equipment 108, the user equipment 108 starts to receive and decode the associated packet data 230 transmitted on the downlink shared data channel 120.

The result of the data packet reception (ACK/NACK/POST/PRE/DTX for H-ARQ processing) 234 is then reported to the base transceiver station 102 on the associated uplink scheduled channel 122.

Similarly, the channel quality information (CQI) 236 for the downlink packet scheduling is again transmitted on the uplink scheduled channel 122.

At step 238, once the H-ARQ feedback information and channel quality information has been received, the base transceiver station 102 performs Adaptive Modulation and Coding (AMC), scheduling and retransmission for each user equipment 108. Retransmission occurs if a NACK message is received from the user equipment 108.

The above-mentioned steps 228 to 238 are then repeated at both the base transceiver station 102 and the user equipment 108 during provision of the HSDPA service to the user equipment 108.

Once the HSDPA service provided to the user equipment 108 is to be terminated, the base transceiver station 102 may simply stop transmission of control information on the downlink shared control channel 118 to the user equipment 108, at step 240.

In this case, upon failure of the user equipment 108 at step 242 to detect HSDPA control information within a predetermined time, the HSDPA service is terminated and the user equipment 108 is again placed in an inactive state.

Alternatively, the HSDPA service can be terminated by inclusion of the termination message in a packet header of an HSDPA control information packet sent to the user equipment 108 on the downlink shared data channel 120. Upon detection of the termination message at the user equipment 108, the HSDPA service may be terminated.

From the foregoing, it will be appreciated that the above-described method for providing an HSDPA service to a user equipment advantageously introduces a specific paging procedure and specific paging indication for an HSDPA service without requiring use of a dedicated data channel as currently described in WCDMA networks.

Moreover, the above-described method introduces a sleep mode to allow the Super 3G user equipment to save power when in use. A new channel is introduced to establish the Radio Resource Control (RRC) layer peer to peer communication for HSDPA RAN configuration, rather than relying upon a dedicated channel as in current WCDMA systems.

A packet transmission termination scheme is also introduced at the radio interface level to allow either the base transceiver station 102 to terminate a downlink packet transmission either temporarily or permanently whilst minimizing the exchange of traffic via the air interface between the base transceiver station 102 and the user equipment 108.

Finally, it is to be appreciated that various modifications and additions may be made to the above-described method of providing a high speed downlink packet access service to a user equipment in the spread spectrum communication network without departing from the spirit or ambit of the invention.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

This application is based upon and claims the benefit of priority from Australian Patent Application No. 2005-904679 filed on Aug. 26, 2005, the entire disclosure of which, including specification, claims, drawings and summary, is incorporated herein by reference in its entirety.

The invention claimed is:

1. A method of providing a packetized data transmission service to a mobile terminal in a spread spectrum communication network, the method including:
   at a base station, broadcasting an indication message to each of a plurality of mobile terminals in a cell on a downlink broadcast channel, the indication message providing notification of an available High Speed Downlink Packet Access service intended for the plurality of mobile terminals, the plurality of mobile terminals including a first mobile terminal supporting the High Speed Downlink Packet Access service;
   at the first mobile terminal,
      periodically placing the mobile terminal in an active state to monitor the downlink broadcast channel for the indication message,
      monitoring the downlink broadcast channel for the indication message,
      transmitting channel quality measurement and reporting information to the base station on an uplink shared scheduled channel,
      placing the mobile terminal in an inactive state, if no indication message is detected, and
      upon receipt of the indication message, transmitting an acknowledgement of detection of the indication message to the base station on an uplink contention channel; and
   at the base station, upon contention completion,
      transmitting High Speed Downlink Packet Access service configuration information to the first mobile terminal transmitting the acknowledgement on the downlink broadcast channel,
      transmitting control information for the High Speed Downlink Packet Access service to the first mobile terminal on a downlink shared control channel, and
      transmitting data for the High Speed Downlink Packet Access service to the first mobile terminal on a downlink shared data channel.

2. The method as set forth in claim 1, further including the steps of:
   ceasing transmission from the base station of High Speed Downlink Packet Access control information to the first mobile terminal; and
   upon failure to detect the High Speed Downlink Packet Access control information at the first mobile terminal within a predetermined time, terminating the High Speed Downlink Packet Access service.

3. The method as set forth in claim 1, further including the steps of:
   at the base station, notifying the first mobile terminal to terminate the High Speed Downlink Packet Access service by inclusion of a termination message in a packet header of a High Speed Downlink Packet Access control information packet; and
   upon detection of the termination message at the first mobile terminal, terminating the High Speed Downlink Packet Access service.

4. The method as set forth in claim 1, wherein the first mobile terminal is comprised of a mobile phone.

5. A method of controlling operation of a base station for providing a packetized data transmission service to a mobile terminal in a spread spectrum communication network, the method including:
   broadcasting an indication message to each of a plurality of mobile terminals in a cell on a downlink broadcast channel, the indication message providing notification of an available High Speed Downlink Packet Access service intended for the plurality of mobile terminals, the plurality of mobile terminals including a first mobile terminal supporting the High Speed Downlink Packet Access service, the first mobile terminal periodically transitioning to an active state to monitor the downlink broadcast channel for the indication message, transmit channel quality measurement and reporting information to the base station on an uplink shared scheduled channel, monitoring the downlink broadcast channel for the indication message, transitioning to an inactive state, if no indication message is detected, and upon receipt of the indication message, transmitting an acknowledgement of detection of the indication message to the base station on an uplink contention channel; and
   upon contention completion,
      transmitting High Speed Downlink Packet Access service configuration information to the first mobile terminal transmitting the acknowledgement on the downlink broadcast channel;
      transmitting control information for the High Speed Downlink Packet Access service to the first mobile terminal on a downlink shared control channel, and
      transmitting data for the High Speed Downlink Packet Access service to the first mobile terminal on a downlink shared data channel.

6. The method as set forth in claim 5, further including the steps of:
   ceasing transmission of High Speed Downlink Packet Access control information to the first mobile terminal; and
   upon failure to detect the High Speed Downlink Packet Access service control information at the first mobile terminal within a predetermined time, terminating the High Speed Downlink Packet Access service.

7. The method as set forth in claim 5, further including steps of:
   notifying the first mobile terminal to terminate the High Speed Downlink Packet Access service by inclusion of a termination message in a packet header of a High Speed Downlink Packet Access control information packet; and upon detection of the termination message at the first mobile terminal, terminating the High Speed Downlink Packet Access service.

8. A non-transitory computer-readable medium storing therein a program for causing a computer equipped in a base station to carry out a method defined in claim 5.

9. A system for providing a packetized data transmission service in a spread spectrum communication network, the system including:

a base station and a plurality of mobile terminals, the plurality of mobile terminals including a first mobile terminal supporting a High Speed Downlink Packet Access service, the base station being adapted to broadcast an indication message to each of the plurality of mobile terminals in a cell on a downlink broadcast channel, the indication message providing notification of an available High Speed Downlink Packet Access service intended for the plurality of mobile terminals;

the first mobile terminal being adapted to periodically transition to an active state to monitor the downlink broadcast channel for the indication message, transmit channel quality measurement and reporting information to the base station on an uplink shared scheduled channel, monitor the downlink broadcast channel for the indication message, transition to an inactive state, if no indication message is detected, and upon receipt of the indication message, transmit an acknowledgement of detection of the indication message to the base station on an uplink contention channel; and the base station being further adapted, upon contention completion, to transmit High Speed Downlink Packet Access service configuration information to the first mobile terminal transmitting the acknowledgement on the downlink broadcast channel;

transmit control information for the High Speed Downlink Packet Access service to the first mobile terminal on a downlink shared control channel, and transmit data for the High Speed Downlink Packet Access service to the first mobile terminal on a downlink shared data channel.

10. The system as set forth in claim 9, wherein the first mobile terminal is comprised of a mobile phone.

11. A base station in a system for providing a packetized data transmission service in a spread spectrum communication network, the system including:

the base station and a plurality of mobile terminals, the plurality of mobile terminals including a first mobile terminal supporting a High Speed Downlink Packet Access service;

the base station being adapted to broadcast an indication message to each of the plurality of mobile terminals in a cell on a downlink broadcast channel, the indication message providing notification of an available High Speed Downlink Packet Access service intended for the plurality of mobile terminals, wherein the first mobile terminal is adapted to transmit channel quality measurement and reporting information to the base station on an uplink shared scheduled channel, monitor the downlink broadcast channel for the indication message, and upon receipt, transmit an acknowledgement of detection of the indication message to the base station on an uplink contention channel; and the base station being further adapted, upon contention completion, to transmit High Speed Downlink Packet Access service configuration information to the first mobile terminal transmitting the acknowledgement on the downlink broadcast channel;

transmit control information for the High Speed Downlink Packet Access service to the first mobile terminal on a downlink shared control channel, and transmit data for the High Speed Downlink Packet Access service to the first mobile terminal on a downlink shared data channel.

* * * * *